Feb. 8, 1927.                                                            1,616,919
J. F. O'CONNOR
FRICTION SHOCK ABSORBING MECHANISM
Filed Feb. 2, 1925
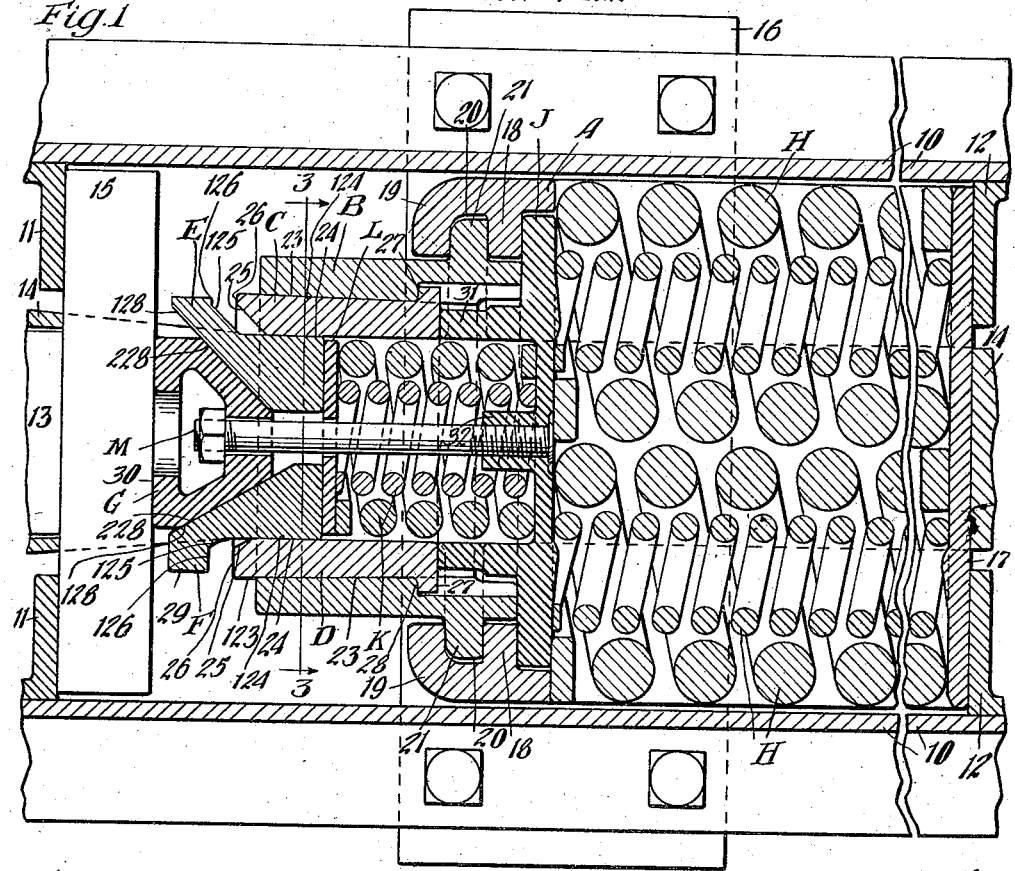
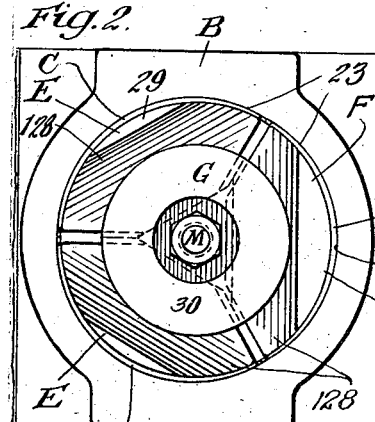
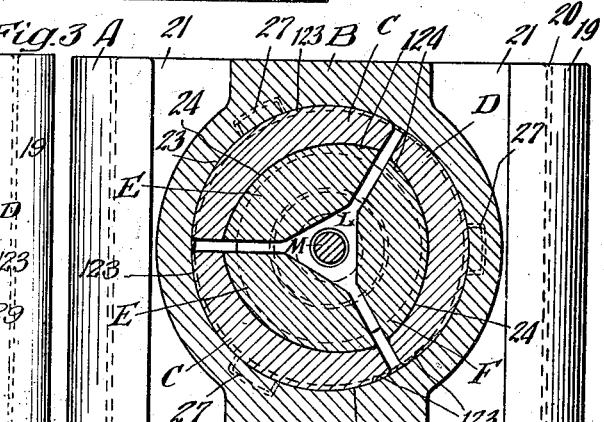
Witnesses
Wm. Geiger
Inventor
John F. O'Connor
By George I. Haight
His Atty Patented Feb. 8, 1927.

1,616,919

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 2, 1925. Serial No. 6,225.

This invention relates to improvements in friction shock absorbing mechanisms.

One object of the invention is to provide a high capacity friction shock absorbing mechanism for railway draft riggings, having relatively light, initial or preliminary resistance followed by heavier frictional resistance during the remainder of the compression stroke.

Another object of the invention is to provide a friction shock absorbing mechanism, employing a friction shell having a plurality of friction elements directly cooperating therewith, resisted by a relatively heavy spring element to absorb the heavier shocks, and a plurality of additional friction elements resisted by a relatively light spring during initial action of the mechanism to absorb the lighter shocks.

A further and more specific object of the invention is to provide a friction shock absorbing mechanism, including a friction shell having a plurality of friction shoes cooperating therewith, wherein certain of the shoes have limited movement relative to the remaining shoes to provide for preliminary light action and wherein all of the shoes are adapted to move in unison with reference to the shell during the remainder of the compression stroke to provide heavier final action.

Other objects and advantages of the invention will more clearly and fully appear from the description and claims hereinafter following.

In the drawing forming a part of this specification, Figure 1 is a longitudinal, horizontal, sectional view of a portion of a railway draft rigging, showing my improvements in connection therewith, the section through the friction elements corresponding to two section planes 120° apart. Figure 2 is a front end elevational view partly broken away of the shock absorbing mechanism proper, and Figure 3 is a transverse, vertical, sectional view corresponding substantially to the line 3—3 of Figure 1.

In said drawings, 10—10 indicates channel-shaped center or draft sills of a railway car underframe, to the inner faces of which are secured front stop lugs 11—11 and rear stop lugs 12—12. The inner end of the drawbar is indicated at 13, to which is operatively secured a yoke 14 of well-known construction. Within the yoke are disposed the usual front follower 15 and the shock absorbing mechanism proper, hereinafter more fully described. The yoke and parts contained therewithin are supported in operative position by a detachable saddle plate 16.

My improved shock absorbing mechanism proper, as shown, comprises broadly, a spring cage casting A, a friction shell B; a set of outer friction shoes C, C, D; a set of inner friction wedge shoes E, E and F; a main wedge G; twin arranged main spring resistance elements H—H; a main spring follower J; an auxiliary spring resistance K; an auxiliary spring follower L; and a retainer bolt M.

The spring cage casting A is of generally rectangular box-like form having a transverse end wall 17 adapted to co-operate with the stop lugs 12 in the manner of the usual rear-follower. The casing is open at its opposite sides to permit lateral insertion of the twin arranged main spring resistance elements H. At the forward end, the opposite side walls of the casing are provided with alined, vertically disposed ribs 18—18 and vertical flanges 19—19, the latter being disposed forwardly of the ribs and spaced therefrom to provide slots 20 therebetween, extending from the top to the bottom of the spring cage.

The friction shell B is of generally cylindrical form and has a pair of laterally projecting flanges 21—21 at the rear end thereof adapted to be inserted in the slots 20 of the spring cage to retain the shell in assembled relation with the latter and prevent longitudinal movement thereof with reference to the cage. The interior of the shell B is provided with a series of independent, cylindrical friction surfaces 23—23, the same being converged inwardly of the shell and so disposed that the inner ends form a complete, true circle as clearly indicated in Figure 3. As clearly indicated in Figure 1, the rear end of the friction shell extends beyond the flanges 21 thereof a distance at least equal to the thickness of the respective ribs 18.

The three friction shoes C, C and D are of like construction, except as hereinafter pointed out. Each shoe is formed with an outer, true cylindrical friction surface 123 adapted to co-operate with the respective shell friction surfaces 23 and an inner, true cylindrical friction surface 24 adapted to cooperate with one of the friction shoes of the inner set. At the forward end, each shoe is provided with a relatively short inner beveled face 25 for convenience in construction. As clearly shown in Figure 1, the beveled faces 25 of the shoes C, C and D terminate short of the outer sides of the shoes, thereby providing flat abutment surfaces 26 at the forward ends of said shoes adapted to engage shoes E, E and F. At the rear end, each of the shoes C, C and D is provided with a lateral flange 27 adapted to cooperate with an annular shoulder 28 on the inner side of the friction shell to positively limit the outward movement of the shoe.

Three friction wedge shoes E, E and F are also of like construction, except as hereinafter pointed out. Each wedge shoe is formed with an outer, true cylindrical friction surface 124 adapted to cooperate with the friction surface 24 of the corresponding outer shoe. At the outer end, each shoe is provided with a wedge face 128 on the inner side thereof. The faces 128 of the two shoes E extend at a relatively blunt angle with respect to the longitudinal axis of the mechanism and the faces 128 of the shoe F extends at a relatively keen angle to said axis. As clearly shown in Figure 1, the wedge shoes E, E and F have their forward ends projecting outwardly beyond the shoes C, C and D and have portions thereof extended laterally as indicated at 29, the projecting portions 29 being longitudinally alined with the respective shoes C, C and D and spaced therefrom. On the inner side of the projecting portion, each wedge shoe has a beveled face 125 correspondingly inclined to the beveled face 25 of the corresponding friction shoe of the outer set. Each of the shoes E, E and F is also provided with a transverse abutment face 126 adapted to cooperate with the abutment faces 26 of the corresponding shoe of the outer set to limit relative movement of the shoes of the inner and outer set after a predetermined compression of the mechanism. In this connection, it is pointed out that the shoes C, C, D, E, E and F are preferably all made of cast steel and that the shell is preferably made of malleable iron. With such an arrangement, it will be evident that it is not absolutely essential that the shoes C, C and D be provided with means for limiting their outward movement, such as the lugs 27. Due to the relatively higher frictional resistance between malleable iron and steel than between steel and steel, the inner set of shoes will readily slip outwardly with reference to the outer set during release of the mechanism while outward movement of the outer set of shoes will be retarded by the friction between the same and the shell and be returned to release position by engagement with follower J.

The wedge G is preferably in the form of a cast block having a flat front face 30 adapted to bear directly against the front follower 15. At the inner end the block G is provided with three rearwardly converging wedge faces 228—228 arranged around the axis of the mechanism. Two of the faces 228 coact with the faces 128 of the two blunt shoes E and are correspondingly inclined, and the remaining wedge face 228 is inclined to correspond with the wedge face 128 of the shoe F and is adapted to cooperate therewith.

The spring follower J is in the form of a generally rectangular plate having a forwardly projecting annular flange 31 at the front side thereof, adapted to extend into and work within the rear end of the shell B as clearly illustrated in Figure 1. The annular flange 31 is adapted to abut the rear ends of the shoes C, C and D and functions as a pressure-transmitting member to transmit the actuating force from the shoes C, C and D to the main spring resistance elements H. The annular flange 31 also has another function, namely, that of maintaining the friction shell in assembled relation with the spring cage, the flange 31 preventing vertical movement of the shell when the flange is disposed within the rear end of the latter. Outward movement of the spring follower J is limited by the opposite sides thereof which normally bear on the inner sides of the recess 18 of the cage A.

The twin arranged spring resistance elements H are disposed within the spring cage and have their opposite ends bearing respectively on the main spring follower and the end wall 17 of the cage. Each member of the twin spring resistance elements preferably consists of an inner, relatively light coil and a heavier, outer coil as clearly shown in Figure 1. The auxiliary spring resistance K which also preferably consists of a light inner coil and a relatively heavier outer coil is interposed between the auxiliary spring follower L and the main spring follower J, the rear end of the spring resistance K being seated within the annular flange 31 on the main spring follower. The spring follower L bears directly on the inner ends of the friction wedge shoes E, E and F.

The parts are held under initial compression and of overall, uniform length by the retainer bolt M, which has its opposite ends anchored to the main follower and wedge G respectively, the inner end of the bolt being threaded into a boss 32 on the main spring follower and the head of the bolt at the opposite end thereof being accommodated in a recess within the wedge block G.

Assuming a compression stroke of the mechanism, the operation is as follows: The follower 15 and the casing A carrying the friction shell B will be moved toward each other, thereby setting up a wedging action between the wedge G and the wedge shoes E, E and F. Due to the spreading action thus effected, the shoes C, C and D will all be spread apart, thereby forcing the same into frictional engagement with the shell B. During the further relative approach of the follower and casing, the wedge G will be carried inwardly of the friction shell forcing the shoes E, E and F, to slide inwardly on the friction surfaces of the shoes C, C and D, compressing the auxiliary spring against the main spring follower J, the latter during this stage of the operation being retained in its outermost position by the main springs H. The main springs are preferably under considerable initial compression so that there will be substantially no movement of the spring follower J during the action just described. The relative movement of the shoes continues until the faces 25 and 125 and the shoulders 26 and 126 thereof come into abutment, whereupon the shoes C, C and D will be carried inwardly in unison with the shoes E, E and F. There will be no further compression of the auxiliary spring resistance during the remainder of the compression stroke, inasmuch as the relative movement of the shoes is positively arrested at the end of the preliminary action just described. During the remainder of the compression stroke, the shoes C, C and D will be forced to slide on the friction surfaces of the shell, B, the inward movement of the shoes being resisted by the twin arranged main spring resistance elements, the pressure being transmitted from the former to the latter directly through the main spring follower J, which has the flange 31 thereof in abutment with the inner ends of the shoes C and D. This action will continue until the actuating force is reduced, or until the main follower comes into engagement with the outer end of the friction shell, whereby the pressure will be transmitted directly through the shell and spring cage to the corresponding stop lugs. During this latter part of the travel, there will be differential action between shoes and wedge G, due to taper of walls of the friction shell.

Due to the employment of the blunt and keen sets of wedge faces, I am enabled to obtain a very high wedging action during the compression stroke, since the wedge faces may be made relatively acute without danger of the parts sticking, the blunt wedge faces acting more or less as "safety valves" to prevent sticking. In this connection, it will be understood by those skilled in the art that my improvements are capable of use in a mechanism either employing a blunt and keen angle system, or wedge faces which are all of the same angle with respect to the axis of the mechanism. It will also be understood that the co-acting friction surfaces of the inner and outer sets of friction shoes may be arranged to converge inwardly of the mechanism instead of being disposed parallel to the axis of the same.

In release, the main and auxiliary springs effectively restore all the parts to normal position, the lugs 21 on the shoes C, C and D limiting the outward movement thereof to properly space the same with reference to the shoulders on the inner set of shoes. When the mechanism is in full release, outward movement of the wedge G and co-acting parts will be limited by the retainer bolt M. It will also be evident that the annular flange 31 on the main spring follower J serves to positively force the shoes C and D to their full release position.

The preliminary action provided in my improved shock absorbing mechanism, as hereinbefore described, particularly adapts the same for use in connection with passenger cars.

While I have herein shown and described the preferred manner of carrying out my invention, the same is merely illustrative and I contemplate all changes and modifications that come within the scope of the claims appended hereto.

I claim:

1. In a friction shock absorbing mechanism, the combination with a friction shell provided with friction surfaces; friction shoes cooperating with the shell friction surfaces; a main spring resistance element opposing relative movement of said shoes and shell; wedge shoes having frictional engagement with said first named shoes, and having limited relative movement thereto; a preliminary spring resistance opposing relative movement of said first and second named shoes during the limited relative movement thereof; and wedge-pressure transmitting means co-operating with the wedge shoes, only for forcing the same outwardly against said friction shoes to press the latter against said shell friction surfaces.

2. In a friction shock absorbing mechanism, the combination with a friction shell; two sets of friction shoes, said sets being relatively movable with reference to each other to a limited extent and having frictional engagement with each other; and one only of said sets having frictional engagement with the shell; a main spring resistance element opposing movement of one set of shoes; a preliminary spring resistance element opposing relative movement of the two sets of shoes during the limited movement thereof; and wedge-pressure-transmitting means for forcing said sets of shoes into intimate frictional contact and forcing the sets of shoes having frictional engagement with the shell into intimate contact with the latter.

3. In a friction shock absorbing mechanism, the combination with a column element having friction surfaces; of a plurality of co-operating friction shoes having interengaging friction surfaces, certain of said shoes being movable with reference to the remaining shoes during preliminary action of the mechanism, the last named shoes having frictional engagement with the friction surfaces of said element; a spring resistance element opposing relative movement of the friction elements and the shoes cooperating therewith; means for limiting relative movement of said co-operating shoes after a predetermined compression of the mechanism; a preliminary spring resistance element opposing relative movement of said co-operating shoes during said preliminary action; and pressure transmitting spreading means for pressing said shoes having frictional engagement with said element into intimate contact therewith.

4. In a friction shock absorbing mechanism, the combination with a plurality of relatively movable friction elements; of pressure-transmitting means for moving said elements relatively to each other and forcing the same into tight frictional contact; co-acting means on certain of said elements for limiting the relative movement thereof during compression of the mechanism; a spring resistance opposing relative movement between the elements having limited relative movement; and a second spring resistance opposing relative movement between said last named elements and the remaining elements, said last named spring resistance being of greater capacity than said first named spring resistance.

5. In a friction shock absorbing mechanism, the combination with a friction shell; of a plurality of friction shoes cooperating with the friction shell and movable inwardly thereof during compression of the mechanism; additional shoes having frictional engagement with said first named shoes; a spring resistance cooperating with the first named shoes; and an additional spring co-operating with the remaining shoes; interengaging abutment means on said first and second named shoes for arresting relative movement after a predetermined compression of the mechanism; and wedge-pressure-transmitting means cooperating with said second named shoes.

6. In a friction shock absorbing mechanism, the combination with a friction shell; of a plurality of friction shoes cooperating with the friction shell and movable inwardly thereof during compression of the mechanism; additional shoes having frictional engagement with said first named shoes; a spring resistance cooperating with the first named shoes; an additional spring cooperating with the remaining shoes; wedge faces on said first and second named shoes, said faces being normally spaced apart to permit a predetermined amount of preliminary action and adapted to interengage to effect movement of said first named shoes in unison with said second named shoes after full compression of the additional spring resistance; and wedge-pressure-transmitting means co-operating with said second named shoes.

7. In a friction shock absorbing mechanism, the combination with a friction shell; of a plurality of friction shoes cooperating with the friction shell and movable inwardly thereof during compression of the mechanism; additional shoes having frictional engagement with said first named shoes; a spring resistance cooperating with the first named shoes; and an additional spring co-operating with the remaining shoes; a spring follower interposed between said spring resistance elements, said spring follower also engaging said first named shoes; means operative after a predetermined relative movement of said first and second named shoes for causing all of said shoes to move in unison inwardly of the mechanism during the remainder of the compression stroke; and wedge-pressure-transmitting means co-operating with said second named shoes.

8. In a friction shock absorbing mechanism, the combination with a friction shell; of friction shoes cooperating with the shell; a main spring resisting movement of said shoes inwardly of the shell; wedge-shoes having frictional engagement with said first named shoes; an additional spring resisting relative movement of said first and second named shoes; and wedge-pressure transmitting means having wedge faces cooperating with said wedge faces of the second named shoes, said means and certain of said shoes having the cooperating faces disposed at a relatively blunt releasing angle with reference to the longitudinal axis of the mechanism, and the remaining cooperating faces of said means and wedge shoes being disposed at relatively keen wedge-acting angles with reference to said axis.

9. In a friction shock absorbing mechanism, the combination with a friction shell; a friction wedge system co-acting with the shell, said system including a plurality of friction-shoes, and wedge means for spreading said shoes, said shoes having limited relative movement; a main spring resistance; pressure-transmitting means; and a preliminary spring resistance operatively interposed between certain of said shoes and the pressure transmitting means, said pressure transmitting means directly co-acting with the remaining shoes to transmit the actuating force directly therefrom to the main spring resistance after the preliminary spring has been compressed to a predetermined extent.

10. In a friction shock absorbing mechanism, the combination with a friction member having friction surfaces; of a set of friction elements directly co-operable with said friction surfaces; a second set of friction elements having frictional engagement only with said first named set of friction elements and adapted for limited movement with respect thereto during the initial portion of a compression stroke; wedge-pressure transmitting means cooperable with said second named set of friction elements; and spring means for initially resisting relative movement between said first named set of friction elements and friction member while relative movement is taking place between said first and second named sets of friction elements and for thereafter yieldingly resisting relative movement between said friction member and said friction elements.

In witness that I claim the foregoing I have hereunto subscribed my name this 31st day of January 1925.

JOHN F. O'CONNOR.